(No Model.) 2 Sheets—Sheet 1.

J. W. MARTIN.
VEHICLE BRAKE.

No. 401,960. Patented Apr. 23, 1889.

WITNESSES.
Sara L. Schrader.
W. M. Byrne.

INVENTOR.
John W. Martin by
Paul Bakewell
his attorney.

N. PETERS, Photo-Lithographer, Washington, D. C.

(No Model.) 2 Sheets—Sheet 2.

J. W. MARTIN.
VEHICLE BRAKE.

No. 401,960. Patented Apr. 23, 1889.

WITNESSES.
Sara L. Schrader.
W. M. Byrne.

INVENTOR.
John W. Martin by
Paul Bakewell
his attorney

UNITED STATES PATENT OFFICE.

JOHN W. MARTIN, OF ST. LOUIS, MISSOURI, ASSIGNOR TO THE ST. LOUIS DEAD LOCK BRAKE COMPANY, OF ILLINOIS.

VEHICLE-BRAKE.

SPECIFICATION forming part of Letters Patent No. 401,960, dated April 23, 1889.

Application filed October 22, 1888. Serial No. 288,830. (No model.)

*To all whom it may concern:*

Be it known that I, JOHN W. MARTIN, a citizen of the United States, residing at the city of St. Louis, State of Missouri, have invented a certain new and useful Improvement in Vehicle-Brakes, of which the following is a full, clear, and exact description.

My invention relates to improvements on that for which Letters Patent have been granted to myself and Asa S. Mason, dated April 17, 1888, No. 381,502, for improvement in vehicle-brakes, and has for its object to enable one or both the hind wheels of a wagon or other vehicle to be locked and released, as desired.

It consists in the combination of one or preferably two slotted hooked bars (one to each hind wheel) which are pivoted to the sides of levers depending from and hinged to the under side of the wagon bed or framing, a chain connecting the end of each of the slotted hooked bars to the wagon-bed, and an arm fulcrumed to each of the said levers and inclined therefrom transversely beneath the wagon-bed, where the free end of one arm is jointed to the end of a rod mounted longitudinally in bearings and passing through a slot in the free end portion of the other arm, which is provided thereat with an adjustable device, the whole being arranged and operating so that when the rod is pulled longitudinally in its bearings by suitable mechanism from any convenient part of the wagon the arms are vibrated on their fulcrums and diverging the levers carrying the hooked bars cause one of the latter to engage with and lock the corresponding wheel of the wagon and the other hooked bar to be moved an equal distance toward but clear of the other wheel, when by a continued movement of the rod the arms are vibrated to a further extent and cause the disengaged hook-bar to close upon and lock the other wheel, the thrust due to the vibration of the arm of the previously-locked wheel being taken up by the adjustable device.

Figure 1:
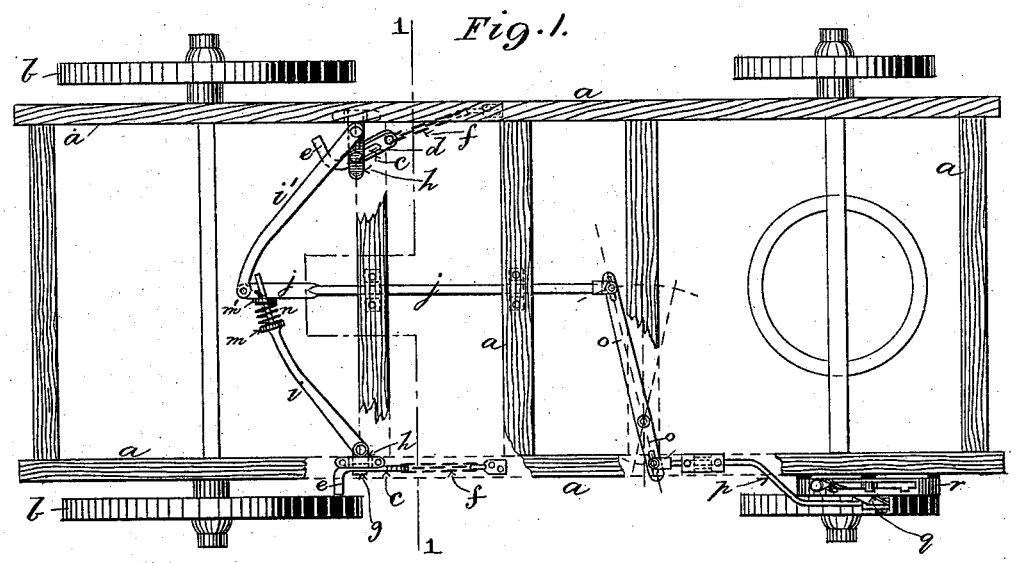
Figure 2:
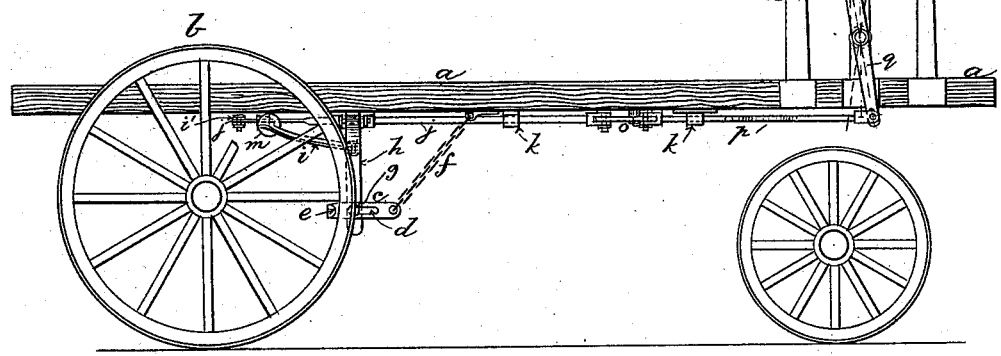
Figure 3:
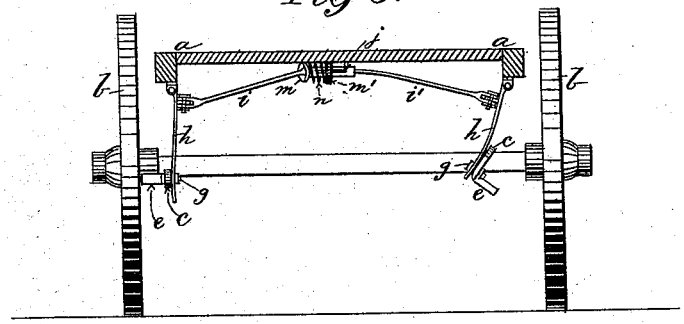
Figure 4:
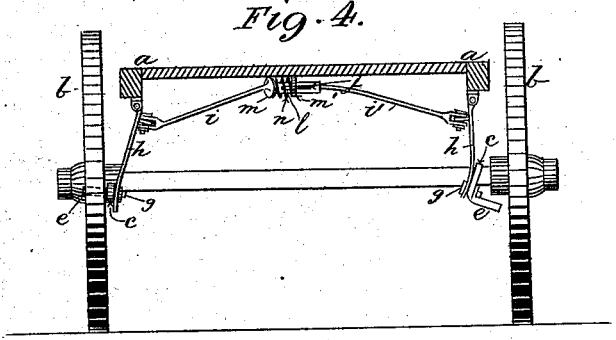
Figure 5:
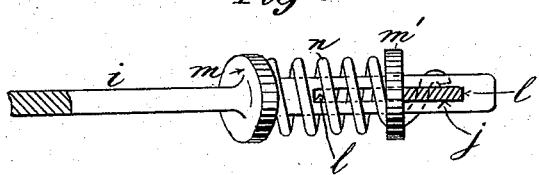

On the accompanying drawings, Figure 1 represents a plan of my improved brake as applied to a wagon, broken away; Fig. 2, a side elevation thereof; Fig. 3, a transverse section on line 1 1 in Fig. 1, showing the brake when released from both wheels; Fig. 4, a similar view with one wheel locked by the brake; and Fig. 5, a detached view to an enlarged scale of part of Fig. 1, like letters of reference denoting like parts in all the figures.

$a$ represents the bed or frame-work, and $b$ the hind wheels, of a wagon. Adjacent to the felly on the inside of one or preferably each wheel $b$ is arranged parallel with the latter a bar, $c$, which is formed with a longitudinal slot, $d$, and provided at one end with a hook, $e$, facing the wheel $b$, the other and heavier end of the bar $c$ being connected by a chain, $f$, to the under side of the wagon-bed $a$.

Each bar $c$ is pivoted by a pin or bolt, $g$, passing through the slot $d$ to the side of a lever, $h$, which depends from and is hinged at its upper end to the under side of the wagon-bed $a$, so as to be capable of movement to and from the wheel $b$. To the inside of the levers $h$ are fulcrumed arms $i\ i'$, the arm $i$ extending from the left-hand lever $h$ at a suitable horizontal angle therefrom transversely beneath the wagon-bed $a$, and the arm $i'$ in a similar manner from the right-hand lever $h$ toward the center of the bed $a$, where its free end is jointed to the rear end of a rod, $j$, which is mounted in guide-brackets $k$, secured to the under side of the wagon-bed $a$, and extends longitudinally with the latter toward the front of the wagon.

The free end of the arm $i$, which extends somewhat beyond the rod $j$, is preferably of a vertical flat section (see more particularly Fig. 5) having a longitudinal slot, $l$, through which the horizontal flat end portion of the rod $j$ passes. The slot $l$, which normally bears at its outer end against the right-hand edge of the rod $j$, extends backward from the latter for a certain distance along the arm $i$, which is formed behind the rear end of the slot $l$ with a fixed collar, $m$. Around the flat portion of the arm $i$ is placed a loose washer, $m'$, which is normally held against the left-hand edge of the rod $j$ by a spiral spring, $n$, located around the flat of the arm $i$ between the collars $m\ m'$ and secured at its outer end to the rod $j$.

To the front end of the rod $j$ is coupled the inner arm of a horizontally-arranged lever, o, of the first order, which is fulcrumed to the under side of the wagon-bed a, the outer arm of the lever o extending to the side of the wagon, where it is connected by a rod, p, to the lower end of the operating hand-lever q, which is fulcrumed to the side of the wagon and extends upward through the curved slotted guide-bar r to within reach of the operator.

On the side of the hand-lever q are projections or catches s, for engaging in corresponding notches, $s'$ $s^2$ $s^3$, formed in the side of the slotted guide-bar r, and thereby regulating the throw of the hand-lever q according to that required for the various positions of the brake-gear, as hereinafter more particularly referred to.

In operation, the various parts of the brake-gear being in the positions seen in Figs. 1, 2, and 3, and it being desired to apply the brake to the left-hand wheel b, the hand-lever q is thrown over into the mid-position $s^2$, (see dotted lines in Fig. 2,) and the lever o being thereby moved to a corresponding extent pulls forward the rod j, which vibrates the arms $i$ $i'$ and diverges the levers h on their hinges in the direction of the wheels b to an extent sufficient to throw the hooked bar c of the left-hand wheel b outward, so that its hook e passes between the spokes of the wheel, which is thereby caught and then locked while revolving at the junction of one of its spokes with the felly, (see Fig. 4,) the strain on the hook e being transmitted by the bar c and chain f to the wagon-bed a. At the same time the hooked bar c of the right-hand wheel b is moved outward to the same extent, but remains clear of the wheel until it is desired to lock both of the wheels, when, by throwing over the hand-lever q into the extreme forward position, $s^3$, (see dotted lines, Fig. 2,) and thereby pulling the rod j forward again, the arms $i$ $i'$ are further vibrated and diverge the right-hand lever h, so that its hooked bar c engages with and locks the right-hand wheel b. At the same time the arm i, not being able to push out its hooked bar c, which has been previously locked with the left-hand wheel b, is constrained by the thrust of this further vibration to slide over the rod j in the slot l, so as to compress the spring n between the collars m m', and thereby merely tighten the left-hand bar c against its wheel b.

For releasing the brakes the above operation is reversed—that is to say, on throwing back the hand-lever q to the mid-position, $s^2$, the arms $i$ $i'$ are vibrated in the opposite direction and the hooked bar c released from the right-hand wheel, the spiral spring n of the arm i meanwhile recoiling to a corresponding extent without affecting the left-hand wheel b, which still remains locked until the hand-lever q is returned to its original position, s', when the further vibration of the arm i (the end of its slot l being constrained by the rod j) releases the hooked bar c from the left-hand wheel b, as seen in Figs. 1, 2, and 3.

In a similar manner the brakes may be applied to or released from both wheels at one operation by throwing over the hand-lever from s' to $s^3$, or vice versa.

By means of the slots d in the hooked bars c, in conjunction with the pivots g and chains f, connecting the heavier ends of the bars c to the wagon-bed a, the hooks e automatically assume at all times their proper positions for engaging with the wheels b.

I claim as my invention—

1. In a wagon-brake, the combination of a hooked bar having a longitudinal slot and pivoted to a lever hinged to the wagon-bed, and a chain connecting the hooked bar to the wagon-bed, with mechanism for moving the said lever in the direction of the wheels, substantially as described.

2. In a wagon-brake, the combination of hooked bars having longitudinal slots and pivoted to levers hinged to the bed, and chains connecting the hooked bars to the wagon-bed, with mechanism for moving the said levers in the direction of the wheels, substantially as shown, and for the purpose described.

3. In a wagon-brake, the combination of hooked bars having longitudinal slots and pivoted to levers hinged to the wagon-bed, chains connecting the hooked bars to the wagon-bed, and arms fulcrumed to the said levers and inclined transversely beneath the wagon-bed, with mechanism for vibrating said arms, substantially as shown, and for the purpose described.

4. In a wagon-brake, the combination of hooked bars having longitudinal slots and pivoted to levers hinged to the wagon-bed, chains connecting the hooked bars to the wagon-bed, arms fulcrumed to the said levers and inclined transversely beneath the wagon-bed, and a rod coupled to said arms, one of which is slotted and provided with a spring device for rendering it adjustable endwise with said rod, with means for moving the rod longitudinally beneath the wagon-bed, substantially as shown, and for the purpose described.

5. In a wagon-brake, the combination of the hooked bar c, having longitudinal slot d and pivoted lever h, chain f, arm $i'$, and rod j, with mechanism for moving said rod longitudinally beneath the wagon-bed a, substantially as described.

In testimony whereof I affix my signature, in presence of two witnesses, this 19th day of October, 1888.

JOHN W. MARTIN.

Witnesses:
SARA L. SCHRADER,
PAUL BAKEWELL.